United States Patent [19]
Stelzer

[11] 3,838,887
[45] Oct. 1, 1974

[54] PRESSURE CONTROL DEVICE FOR DUAL BRAKE SYSTEM

[75] Inventor: William Stelzer, Milford, Mich.

[73] Assignee: Kelsey-Hayes Company, Romulus, Mich.

[22] Filed: Aug. 16, 1972

[21] Appl. No.: 281,194

Related U.S. Application Data

[63] Continuation of Ser. No. 84,184, Oct. 26, 1970, abandoned, which is a continuation of Ser. No. 782,584, Dec. 10, 1968, abandoned.

[52] U.S. Cl. ................................ 303/6 C, 188/349
[51] Int. Cl. ............................................. B60t 8/26
[58] Field of Search ............... 303/6 C, 84 A, 84 R; 188/349, 151 A, 152; 200/82 D; 340/52 C; 60/54.5 E

[56] References Cited
UNITED STATES PATENTS

| | | | |
|---|---|---|---|
| 3,448,230 | 6/1969 | Bueler | 188/151 A |
| 3,464,741 | 9/1969 | Falk | 303/6 C |
| 3,467,440 | 9/1969 | Strien | 303/6 C |
| 3,469,889 | 9/1969 | Bueler | 303/84 A |
| 3,482,884 | 12/1969 | Kersting | 303/6 C |
| 3,545,814 | 12/1970 | Margetts | 303/6 C |

Primary Examiner—Duane A. Reger
Assistant Examiner—D. C. Butler
Attorney, Agent, or Firm—Harness, Dickey & Pierce

[57] ABSTRACT

A dual hydraulic brake system in which a pressure proportioning valve is interposed between the master cylinder and the rear brake cylinders for the purpose of modulating the brake pressure delivered to the rear brakes during the higher ranges of brake energization. The proportioning valve is also connected to the front brake system and, in one form of the invention it serves to retard or delay the delivery of pressure to the front brakes until a predetermined master cylinder pressure has been developed.

3 Claims, 2 Drawing Figures

PATENTED OCT 1 1974

3,838,887

INVENTOR.
William Stelzer
BY Harness, Dickey & Pierce
ATTORNEYS

PRESSURE CONTROL DEVICE FOR DUAL BRAKE SYSTEM

This is a continuation of application Ser. No. 84,184, filed Oct. 26, 1970, now abandoned, which application is a continuation application Ser. No. 782,584, filed Dec. 10, 1968, now abandoned.

SUMMARY OF THE INVENTION

A dual hydraulic brake system employs a master cylinder having two pistons or the like for separately pressurizing the front and rear brake systems. In all hydraulic brake systems, including dual brake systems, it has been found to be desirable to adjust the relative pressurization of the front and rear brakes during the higher ranges of brake energization. The reason for this is that during rapid deceleration a significant portion of the weight of the vehicle is transferred from the rear wheels to the front wheels. This weight transfer phenomenon is well known in the braking art. As the rate of deceleration is increased the magnitude of weight transfer is increased and the front brakes become capable of handling a greater share of the braking effort without skidding. For this reason, and in order to avoid premature rear wheel skidding, various pressure proportioning devices have been devised for reducing the ratio of rear brake pressure to front brake pressure in accordance with the magnitude of applied master cylinder pressure.

Brake pressure proportioning devices of the above type pose special problems when used in dual brake systems. Should a failure in front brakes occur it is believed to be desirable to deliver maximum pressure to the rear brakes to bring the vehicle to a stop as rapidly as possible. If the front brakes have failed, the danger of losing control of the vehicle as a result of the rear wheels skidding is minimized. This is because the rear wheels will not, under such circumstances, have a tendency to overrun the front wheels. Accordingly, it is desirable to minimize the reduction in rear brake pressure should a failure occur in the pressure of the front brake system. The illustrated embodiments of the present invention are calculated to achieve this objective.

The present invention is characterized by a dual brake system in which pressure is delivered to the rear brakes through a pressure modulating valve having a pressure responsive valve element influenced by both front and rear brake pressures. In the event of a loss of front brake pressure a greater master cylinder pressure will be required in the rear system before the valve element will close to increase the ratio of rear brake pressure to rear system master cylinder pressure.

DETAILED DESCRIPTION OF THE PREFERRED EMBODIMENTS

Figures 1, 2:
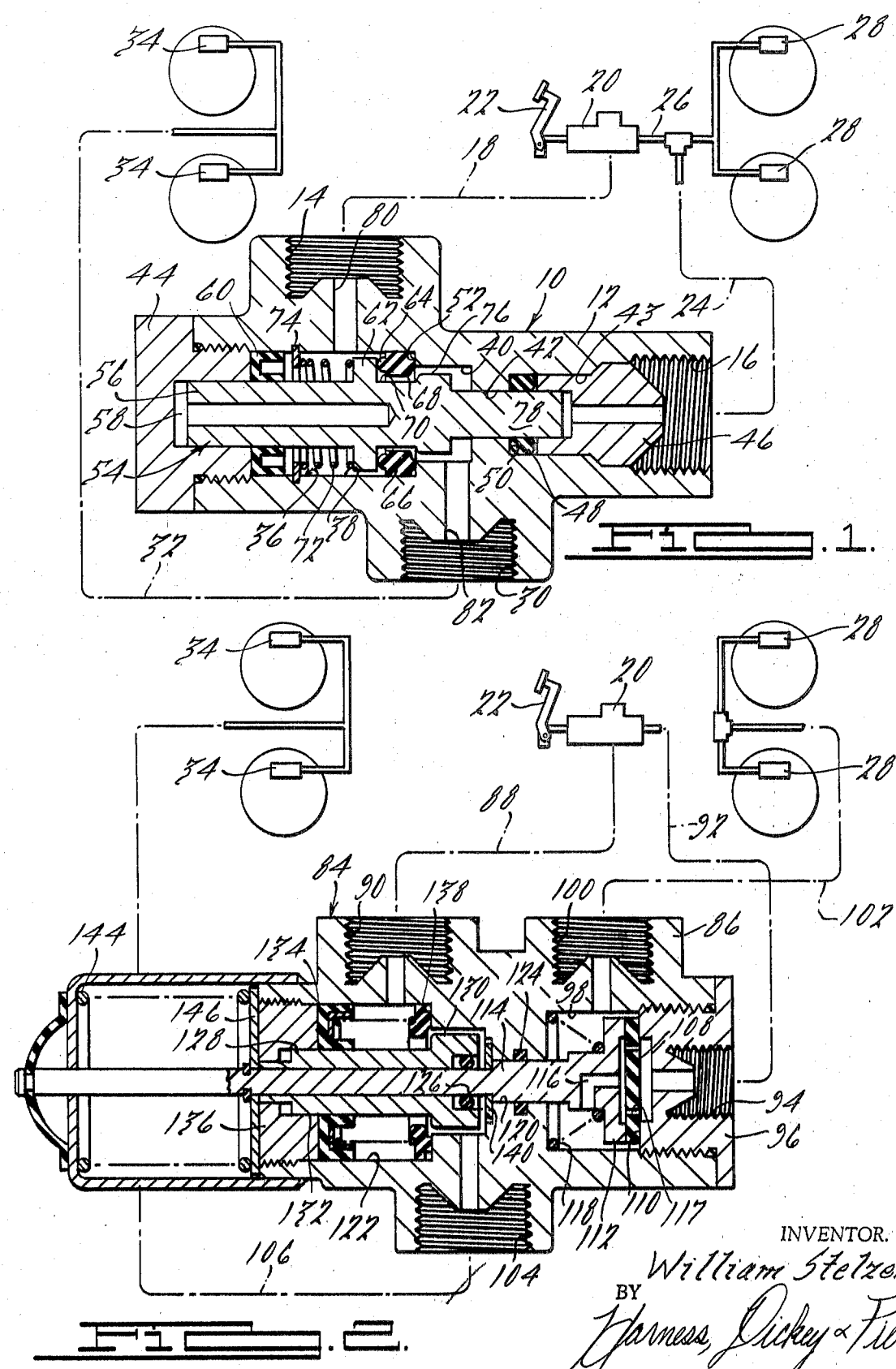
FIG. 1 is a sectional view of a pressure modulating valve shown in association with a schematically illustrated brake system.
FIG. 2 is a view of a structure similarly illustrated in FIG. 1 showing another form of the present invention.

Referring first to FIG. 1, a pressure proportioning valve is indicated generally at 10 and includes a cast metal housing 12 provided with inlet openings 14 and 16. The inlet opening 14 is connected by a brake line 18 to a master cylinder 20 operated by the usual foot pedal 22. The inlet opening 16 is connected by a brake line 24 to a brake line 26 which leads from the master cylinder 20 to front brake cylinders 28. The brake lines 18 and 24 receive brake fluid under pressure from separate pressure developing portions of the master cylinder 20. The housing 12 also has an outlet opening 30 which is connected by a brake line 32 to rear wheel brake cylinder 34.

The housing 12 is formed with a chamber 36 which is defined by coaxial, consecutively arranged bores 38, 40, 42 and 43. The chamber 36 is closed at one end of the housing 12 by means of a threaded plug 44 and is open at its other end to the inlet opening 16. It will be noted that a fitting 46 is inserted through the opening 16 into the bore 43 to define a continuation of the bore 42. An O-ring 48 is positioned in he bore 43 and is held against an annular housing shoulder 50 by the fitting 46. Another shoulder 52 is formed in the housing 12 between the bores 38 and 40.

A differential area piston or pressure responsive valve element 54 is positioned within the chamber 36 for the purpose of modulating the flow of fluid from the inlet opening 14 to the outlet opening 30. Modulation occurs only at higher levels of brake pressure, however. At lower applied pressures the valve element 54 remains in its illustrated position which permits the free flow of fluid through the chamber 36 from the inlet opening 14 to the outlet opening 30. It will be seen that the valve element 54 includes a cylindrical portion 56 which is slidably supported within a blind bore 58 of the plug 44 and is sealed around its outer periphery by a lip seal 60 seated against the wall of the bore 38 and the right-hand end of the plug 44. The valve element 54 has a radially outwardly projecting flange 62 which is normally held against a plurality of circumferentially spaced bosses 64 formed on one side of an annular elastomeric seal 66. The seal 66 is sealingly seated against the shoulder 52. The inner peripheral surface 68 of the seal 66 spacedly surrounds an adjacent portion 70 of the valve element 54. The valve element 54 is held in the position illustrated by a coil spring 72 which is compressed between the flange 62 and a split retaining ring 74 positioned within the wall of the bore 38. The shape of the seal 66 is substantially identical in shape to the correspondingly functioning seal illustrated in my copending application Ser. No. 532,471, filed Mar. 7, 1966. The valve element 54 has a valve head 76 which is engageable with the seal 66 to prevent the flow of fluid from the inlet opening 14 to the outlet opening 30 upon the movement of the valve element 54 against the spring 72. A sleeve-like extension 78 at the right-hand end of the valve element 54 is slidably disposed within the bore 42 and is sealed around its periphery by the O-ring 48.

The manner of operation of the valve 10 and its functional relationship to the brake system as a whole will now be described. Upon the application of the brakes, fluid is delievered from the master cylinder 20 directly to the front brake cylinders 28 through the brake line 26. Front brake pressure will also flow through the brake line 24 to the inlet opening 16 and apply a force to the right-hand end of the sleeve portion 78 of the valve element 54. Fluid will also flow from the master cylinder 20 through the brake line 18 to the inlet opening 14. This fluid is entirely separate from the brake fluid delivered to the front brake cylinders 28 and its pressure is developed bu separate pressure producing means within the master cylinder 20. From the inlet opening 14 fluid flows through passage 80 to the bore 38, thence around the flange 62 of the valve element 54 and between the bosses 64 to the annular space between the inner periphery 68 of the seal 66 and the portion 70 of the valve element 54. Fluid then flows around the valve head 76 to a passage 82 leading to the outlet opening 30. Fluid is then free to flow through the brake 32 to the rear brake cylinders 34.

Assuming that the pressure developed within the brake lines 18 and 26 are the same, the brake pressures initially developed in the rear brake cylinders 34 and front brake cylinders 28 will also be the same. This condition continues to obtain during the lower ranges of applied braking effort. When a predetermined level of pressure is achieved, however, the valve element 54 will move in a left-hand direction to cause the valve head 76 to close against the seal 66 and thereafter modulate the pressure which is transmitted to the rear brake cylinders 34. This movement of the valve element 54 results from the various forces which are applied to it. The relationship of these forces can be expressed mathematically. For this purpose the following symbols will be used:

- $A$ = the cross-sectional area of the cylindrical extension 78.
- $B$ = the cross-sectional area of the mean sealing diameter of the valve head 76.
- $C$ = the cross-sectional area of the cylindrical portion 56 of the valve element 54.
- $S$ = the force of the spring 72.
- $P_f$ = the pressure at the front brake cylinders 28.
- $P_r$ = the pressure at the rear brake cylinders 34.
- $P_m$ = the pressure delivered to the opening 80.

Using these symbols, the valve head 76 will close against the seal 66 when $P_f A + P_m(C-A) > S$. After this point, the valve head 76 will stay substantially in lap position with the seal 66 bleeding small amounts of fluid past it to transmit further pressure increases to the rear brakes at a reduced level, as determined by the following equation:

$$P_f A + P_r(B-A) = S + P_m(B-C)$$

From the foregoing it will be apparent that each increment in $P_m$ will produce a predetermined lesser increment in $P_r$. This will continue so long as $P_f$ is equal to $P_m$. However, if a complete failure occurs in $P_f$, then it will be apparent that $P_r$ must be substantially increased in order to satisfy the equation. Accordingly, a failure in the front brake pressure system will eliminate the substantial reductions in pressure transmitted through the valve 10 to the rear brakes. As a consequence, $P_r$ will be much closer to $P_m$ than was the case prior to the failure of front brake pressure.

Another form of the invention, illustrated in FIG. 2, includes a combined pressure proportioning and metering valve 84 which is embodied within the housing 86. The valve 84 is intended to be incorporated in a dual brake system having a dual master cylinder 20, front brake cylinders 28, rear brake cylinders 34, and a brake line 88 leading from the master cylinder 20 to an inlet opening 90 of the housing 86. A brake line 92 also leads from the master cylinder 20 to an inlet opening 94 formed in a plug 96, closing a bore 98 formed in the housing 86. The housing 86 also has an outlet opening 100 which is connected to a brake line 102 leading to the front brake cylinders 28 and an outlet opening 104 connected to a brake line 106 leading to the rear brake cylinders 34. The flow of fluid from the inlet opening 94 to the outlet opening 100 and thence to the front brake cylinders 28 is arrested by an elastomeric disk shaped seal 108 which is normally held against a shoulder 110 of the plug 96 by the head 112 of a piston or plunger 114. The head 112 is formed with a passage 116 leading from its center to one side thereof. The seal 108 has vent openings 117 for the return of fluid, but its central portion is designed to seal against the opening 116 by the velocity of incoming fluid upon the application of the brakes. This prevents the delivery of pressure to the front brakes so long as the plunger 114 holds the seal 108 against the plug shoulder 110. The plunger 114 is urged in a direction accomplished this function by a spring 118 seated within the bore 98. It will be apparent, however, that upon a left-hand movement of the plunger 114 against the spring 118, fluid will be able to flow between the seal 108 and the plug shoulder 110 and around the plunger head 112 to the outlet opening 100. The pressure of fluid in the line 92 will act against the head 112 to overcome the spring 118 and accomplish this function. The strength of the spring 118 will determine the pressure required.

It is frequently desired to delay the delivery of pressure to the front brakes in a brake system utilizing disk brakes on the front wheels and conventional duo-servo type drum brakes on the rear wheels. Duo-servo drum brakes incorporate heavy return springs and frequently a pressure of 75 to 100 psi is required to overcome such springs in order for the rear brakes to deliver any braking pressure whatsoever. By delaying the application of the front brakes until such a pressure has been built up in he rear brakes, he ront and rear brakes will be applied at approximately the same time and an excessive wearing of the rear brake linings by numerous low pressure stops can be avoided.

It will be seen that the plunger 114 passes through a bore 120 which extends from the bore 98 to a stepped bore 122 formed in the housing 86. A portion of the plunger 114 within the bore 120 is sealed by an O-ring 124. The outer periphery of the plunger 114 within the bore 122 is also sealed by an O-ring 126 which is carried by a piston or pressure responsive valve element 128 having a valve head 130 and a cylindrical portion 132. The cylindrical portion 132 slides within a lip seal 134 which also seals against the wall of the bore 122 and against an apertured threaded plug 136 closing the left-hand end of the bore 122. The valve head 130 cooperates with an annular elastomeric seal 138 positioned within the bore 122 and sealingly engageable with the wall thereof. The plunger 114 carries a washer 140 which is engageable with the valve head 130 upon the collapse of the spring 118 so that the plunger 114 and valve element 128 are effectively united for the purpose of responding to the various pressures and spring forces applied thereto. It will be seen that the valve element 128 is biased to the position illustrated in FIG. 2 by a coil spring 144 which engages a washer 146 abutting the left-hand end of the valve element 128.

The plunger 114 initially serves to prevent the delivery of brake pressure to the front brake cylinders 28 until a sufficient pressure has been developed within the brake line 92 to overcome the spring 118 and open the seal 108. The fluid pressure at the inlet opening 94 acts against the head 112 over an area bounded by the effective sealing diameter of the seal 108. After the seal 108 opens, pressure within the bore 98 attempts to reclose the seal by applying a force to the head 112 assisting the spring 118. Eventually, however, the pressure of fluid at the inlet opening 94 acting over the cross-sectional area of the plunger 114 will be sufficient to collapse the spring 118 and thereafter the washer 140 will be biased against the valve head 130. From then on the plunger 114 and valve element 128 function substantially as a unit. For the purpose of analyzing the functioning of the various valve parts, the following symbols will be used:

$S_1$ = force of the spring 118
$S_2$ = force of the spring 144
$D$ = cross-sectional area of the bore 120
$E$ = cross-sectional area of the mean sealing diameter of the valve head 130
$F$ = cross-sectional area of the cylindrical portion 132
$P_1$ = pressure at inlet opening 94
$P_2$ = pressure at inlet opening 90
$P_f$ = pressure at front brake cylinders 28
$P_r$ = pressure at rear brake cylinders 34

Assuming that the spring 118 has finally yielded, brake fluid will flow from the inlet opening 90 freely through the bore 122, around the valve head 130 to the outlet opening 104, until a predetermined higher level of pressure is reached as, for example, 300 psi. At such desired higher pressure the valve head 130 will close against the seal 138 to modulate the pressure delivered to the rear brake cylinders 34 in accordance with a present formula. The valve head 130 will initially close when the following condition obtains: $P_1D + P_2(F-D) > S_1 + S_2$. The pressures delivered to the inlet openings 90 and 94 will be determined by the master cylinder 20 and the pressure delivered to the rear brakes ($P_r$) can be determined in accordance with the following formula: $P_2(E-F) + S_1 + S_2 = P_1D + P_r(E-D)$. Should a complete pressure failure occur in the front brake system, then the value of $P_1 D$ would be zero and the value of $P_r$ necessary to satisfy the above equation will be substantially increased. Accordingly, a failure in the front brake pressure will result in a substantially increased pressure delivered to the rear brake cylinders 34.

From the foregoing, it will be apparent that the two forms of pressure modulating devices illustrated herein are adapted for use in a dual brake system sensed wherein a pressure failure in the front brake system is sensed by a pressure modulating device interposed in the connection between the master cylider and the rear brake cylinders to substantially eliminate or minimize the effect of the pressure modulating device in reducing the pressure transmitted to the rear brakes under such circumstances.

I claim:

1. In a dual hydraulic brake system having front and rear brake cylinders and a master cylinder for separately pressurizing said front and rear brake cylinders, that improvement which comprises a pressure modulating valve having a passage through which pressure is transmitted from the master cylinder to the rear brake cylinders, differential area piston means in said valve shiftable to open and close said passage to perform a modulating operation on the fluid transmitted to the rear brake cylinders, said piston means including a portion having the rear brake cylinder pressure acting thereon to move said piston means axially within said valve, and a separate plunger including a portion having the front brake cylinder pressure acting thereon, said plunger being in a position to block the transmission of pressure from the master cylinder to the front brake cylinders until a predetermined level of pressure is produced by the master cylinder, said plunger being moveable independently of said piston means to transmit at least a predetermined portion of said pressure produced by the master cylinder when said predetermined level of pressure is produced by the master cylinder, said plunger acting upon said piston means after said predetermined level of pressure is produced by said master cylinder to move said piston means axially within said valve additionally in accordance with said front cylinder pressure, said piston means and said plunger portion being sealed from one another whereby a pressure failure in the front brake cylinders will modify the opeation of said piston means such that said modulating operation will not be performed thereby.

2. In a hydraulic braking system having front and rear brakes and a master cylinder for separately pressurizing said front and rear brakes, the improvement comprising a pressure proportioning valve interposed between the master cylinder and the rear brakes, said valve having a shiftable pressure responsive valve means provided with a valve head adapted to close against a valve seat to limit the transmission of pressure from the master cylinder to the rear brakes, said valve means having a first effective cross-sectional area exposed to rear system master cylinder pressure after closure of said head, and a second effective area exposed to rear brake pressure after closure of said head, a spring means biasing said valve means in a direction assisting rear system master cylinder pressure, and a plunger having an effective area exposed only to the pressure of the fluid in the front brake system, said plunger being operable to block the flow of fluid from the master cylinder to the front brake cylinders and having a portion thereon which is spaced from a portion of said piston until a predetermined level of master cylinder pressure is attained, said plunger being moveable independently of said piston to bring said plunger portion into abutment with said piston portion at a second predetermined level of pressure to apply a force to said piston modifying the movement thereof, the forces applied to said valve means by said plunger and by pressure acting on said second area after said valve means closure being additive and biasing said head to a closed position against the force of said spring means, said plunger effective area being established relative to said first and second effective areas whereby a failure in front brake pressure will substantially modify the functioning of said valve means.

3. The structure set forth in claim 2 further including a spring biasing said plunger.

* * * * *

UNITED STATES PATENT OFFICE
CERTIFICATE OF CORRECTION

Patent No. 3,838,887                    Dated October 1, 1974

Inventor(s) William Stelzer

It is certified that error appears in the above-identified patent and that said Letters Patent are hereby corrected as shown below:

Column 2, line 20, "he" should be --the--; line 63, "delievered" should be --delivered--. Column 3, line 4, "bu" should be --by--; line 13, before "32" insert --line--; line 14, "pressure" should be --pressures--. Column 4, line 12, after "return" insert --flow--; line 18, "accomplished" should be --accomplishing--; line 37, "he" first occurrence, should be --the--; "he" second occurrence, should be --the--; "ront" should be --front--. Column 5, line 35, "present" should be --preset--; line 51, delete "sensed"; line 54, "cylider" should be --cylinder--. Column 6, line 22, after "front" insert --brake--; line 23, "portion" should be --portions--; line 25, "opeation" should be --operation--.

Signed and sealed this 31st day of December 1974.

(SEAL)
Attest:

McCOY M. GIBSON JR.                    C. MARSHALL DANN
Attesting Officer                      Commissioner of Patents